United States Patent
Tokunaga et al.

(10) Patent No.: US 7,015,611 B2
(45) Date of Patent: Mar. 21, 2006

(54) SPINDLE MOTOR AND RECORDING DISK DRIVING APPARATUS HAVING THE SPINDLE MOTOR

(75) Inventors: Shinya Tokunaga, Koka (JP); Mitsuhiro Kurino, Kodaira (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/904,427

(22) Filed: Nov. 10, 2004

(65) Prior Publication Data

US 2005/0116564 A1 Jun. 2, 2005

(51) Int. Cl.
  *H02K 5/16* (2006.01)
(52) U.S. Cl. .................................... 310/90; 310/67 R
(58) Field of Classification Search .............. 310/67 R, 310/90; 384/107, 112; 360/99.08
See application file for complete search history.

(56) References Cited

U.S. PATENT DOCUMENTS

| | | | |
|---|---|---|---|
| 2003/0031114 A1 | 2/2003 | Noda et al. | 369/269 |
| 2003/0197438 A1 * | 10/2003 | Oku | 310/90 |
| 2003/0230943 A1 | 12/2003 | Tokunaga et al. | 310/90 |
| 2004/0061404 A1 * | 4/2004 | Fujii et al. | 310/216 |
| 2004/0070298 A1 | 4/2004 | Aiello et al. | 310/90 |
| 2004/0091187 A1 | 5/2004 | Aiello et al. | 384/112 |
| 2004/0104634 A1 * | 6/2004 | Nishimura et al. | 310/90 |

* cited by examiner

*Primary Examiner*—Thanh Lam
(74) *Attorney, Agent, or Firm*—Judge Patent Firm (57) ABSTRACT

In a spindle motor, in an upper portion of a stator bearing surrounding wall 32a of a bearing housing 32, a flange 32c projecting outward in the radial direction from the stator bearing surrounding wall 32a is provided, and a tapered face 32e obtained in such a manner that the outer diameter of the bearing housing 32 gradually decreases downward from the flange 32c is formed in the outer face of the stator bearing surrounding wall 32a. A rotor 2 has a yoke 23 facing the bearing housing 32 in the radial direction and the air-fluid boundary is formed in a fifth clearance 40 between the tapered face 32e and the inner face of the yoke 23. By the yoke 23 and the flange 32c which are fit to each other in a non-contact state, a detachment preventing structure is constructed.

19 Claims, 8 Drawing Sheets

SPINDLE MOTOR AND RECORDING DISK DRIVING APPARATUS HAVING THE SPINDLE MOTOR

BACKGROUND OF THE INVENTION

1. Field of the Invention

The present invention relates to an electric spindle motor and a recording disk driving apparatus having the spindle motor.

2. Background Art

Hitherto, a spindle motor having a fluid dynamic pressure bearing in which oil is interposed in a small clearance between a shaft and a sleeve is used for various electronic devices such as a recording disk driving apparatus. In such a spindle motor, for example, to prevent a rotor having a shaft from being detached from a sleeve, a detachment preventing (regulating) structure is constructed between the inner portion of the rotor and the outer portion of the sleeve. By such a detachment preventing structure, the rotor is prevented from moving so as to be apart from the sleeve, and reduction in the thickness of the spindle motor is realized.

In recent years, the recording disk driving apparatus is being used as a recording apparatus of a portable electronic equipment. Consequently, the spindle motor for use in a recording disk driving apparatus is also requested to be smaller and thinner. Attempts are made to address the request by reducing the size of each of members constructing the spindle motor.

To manufacture such a smaller and thinner spindle motor, however, smaller members have to be handled, so that it is difficult to efficiently manufacture a spindle motor.

SUMMARY OF THE INVENTION

An object of the invention is to realize further reduction in size and thickness of a spindle motor and a recording disk driving apparatus having the spindle motor.

Another object of the invention is to provide a smaller and thinner spindle motor having excellent reliability and durability and a recording disk driving apparatus having the spindle motor.

A spindle motor as an example of the invention has a stator assembly and a rotor assembly rotating about a rotation center axis.

The stator assembly comprises: a bracket having a through hole and a cylindrical portion formed at a rim of the through hole; a stator fixed to the bracket; and a stator bearing having a stator bearing surrounding wall disposed in the through hole and extending in the axial direction, and an annular flange projecting outward in the radial direction from the upper end of the stator bearing surrounding wall.

The rotor assembly comprises: a shaft; a rotor upper wall portion fixed to an upper portion in the rotation axial direction of the shaft; a rotor annular portion extending downward in the axial direction from the rotor upper wall portion; a yoke including an inner face positioned on the inner circumference side than the outer circumference position of the flange, and fixed to the rotor annular portion; and a field magnet fixed to the outer portion of the yoke and facing the inner portion of the stator via a clearance in the radial direction.

In a first clearance formed between an upper end face of the stator bearing and an lower face of the rotor upper wall portion, a lubricating fluid is retained and a bearing for rotating the rotor is formed. In a clearance formed between an outer face of the stator bearing surrounding wall and the inner face of the yoke, a taper seal area by which clearance dimension gradually increases downward in the axial direction from the flange is formed, and the lubricating fluid retained and continued from the first clearance forms an air-fluid boundary in the taper seal area.

In the spindle motor as an example of the invention, by disposing the stator bearing in the through hole in the bracket, the spindle motor can be made smaller and thinner as a whole. The yoke has the structure of suppressing an electromagnetic loss of the field magnet, the taper seal structure, and the detachment preventing structure of preventing the rotor from being separated from the stator assembly. Therefore, the spindle motor can be made smaller and thinner as compared with a conventional one.

DETAILED DESCRIPTION OF THE INVENTION

Embodiments of the invention will be described hereinbelow with reference to the drawings. In the following description, when a positional relation or a direction of a member is described as up, down, right and left, it indicates the positional relation or direction in the diagram but not a positional relation or direction when the member is assembled in actual equipment.

First Embodiment

Figure 1:
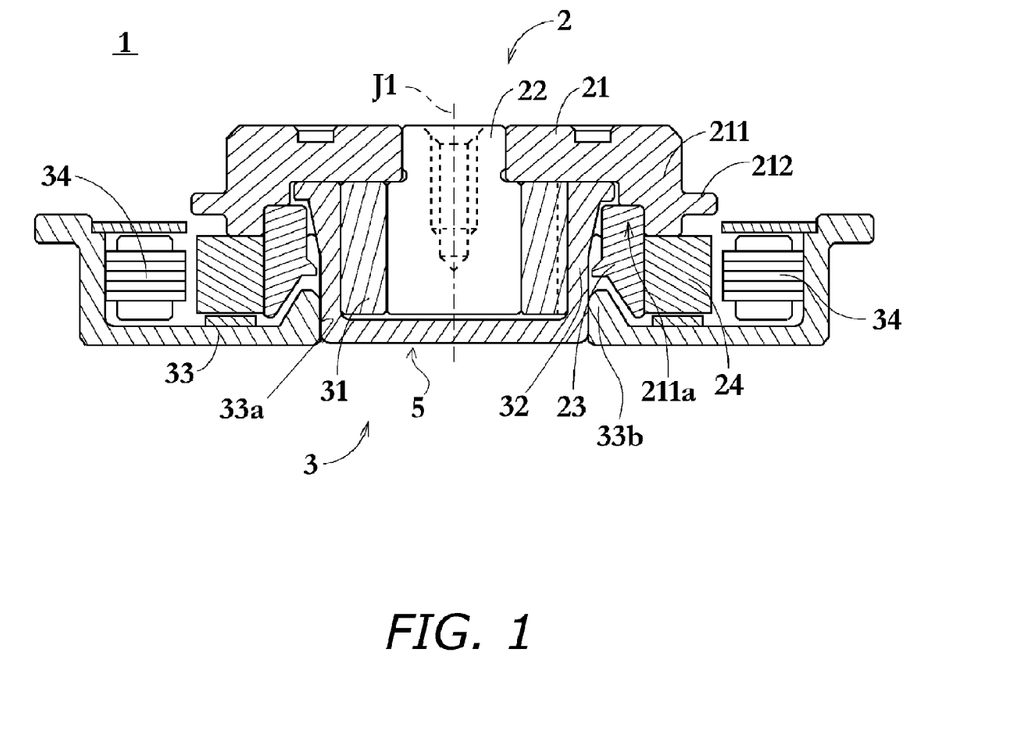
FIG. 1 is a longitudinal section showing a spindle motor of a first embodiment.

General Configuration of Spindle Motor—A spindle motor 1 has a rotor assembly 2 and a stator assembly 3, and the rotor assembly 2 is supported by a fluid dynamic pressure bearing using oil as a lubricant fluid so as to be rotatable on a rotation center axis J1 in contrast to the stator assembly 3.

The rotor assembly 2 has a rotor hub 21 having an approximately disc shape. An upper part of a shaft 22 projecting downward in the axial direction and extending along the rotation center axis J1 is attached to the center of a rotor upper wall 21a of the rotor hub 21. In the outer circumference of the rotor upper wall 21a, a rotor annular portion 211 projecting downward in the axial direction is formed. An annular-shaped notch 211a is formed in an inner lower portion in the axial direction of the rotor annular portion 211.

A yoke 23 having an approximately cylindrical shape made of a magnetic material such as iron is fixed to the notch 211a. A multi-pole magnetized rotor magnet 24 having an annular shape is attached around the yoke 23. A disk mounting portion 212 extending from the outer circumference of the rotor annular portion 211 to the outside in the radial direction is formed in the circumference of the rotor annular portion 211. A recording disk (indicated by reference numeral 82 in FIG. 8) such as a hard disk is mounted on the disk mounting portion 212.

The stator assembly 3 include a bracket 33. A cylindrical portion 33b is provided at the rim of a through hole 33a in which a stator bearing 5 is fit and fixed in the center portion of the bracket 33. A stator 34 facing the rotor magnet 24 in the radial direction is also attached to the bracket 33.

The stator 34 shown in FIG. 1 is connected to a not-shown current supplying circuit. By controlling current to be supplied, driving means constructed by the rotor magnet 24 and the stator 34 generates a torque (rotational force) to rotate the rotor 2 in contrast to the stator 3. At this time, in the spindle motor 1, a magnetic circuit through which a leakage flux from the rotor magnet 24 returns to the rotor magnet 24 via the yoke 23 is formed, so that an electromagnetic loss at the time of driving of the spindle motor 1 is suppressed.

Figure 2:
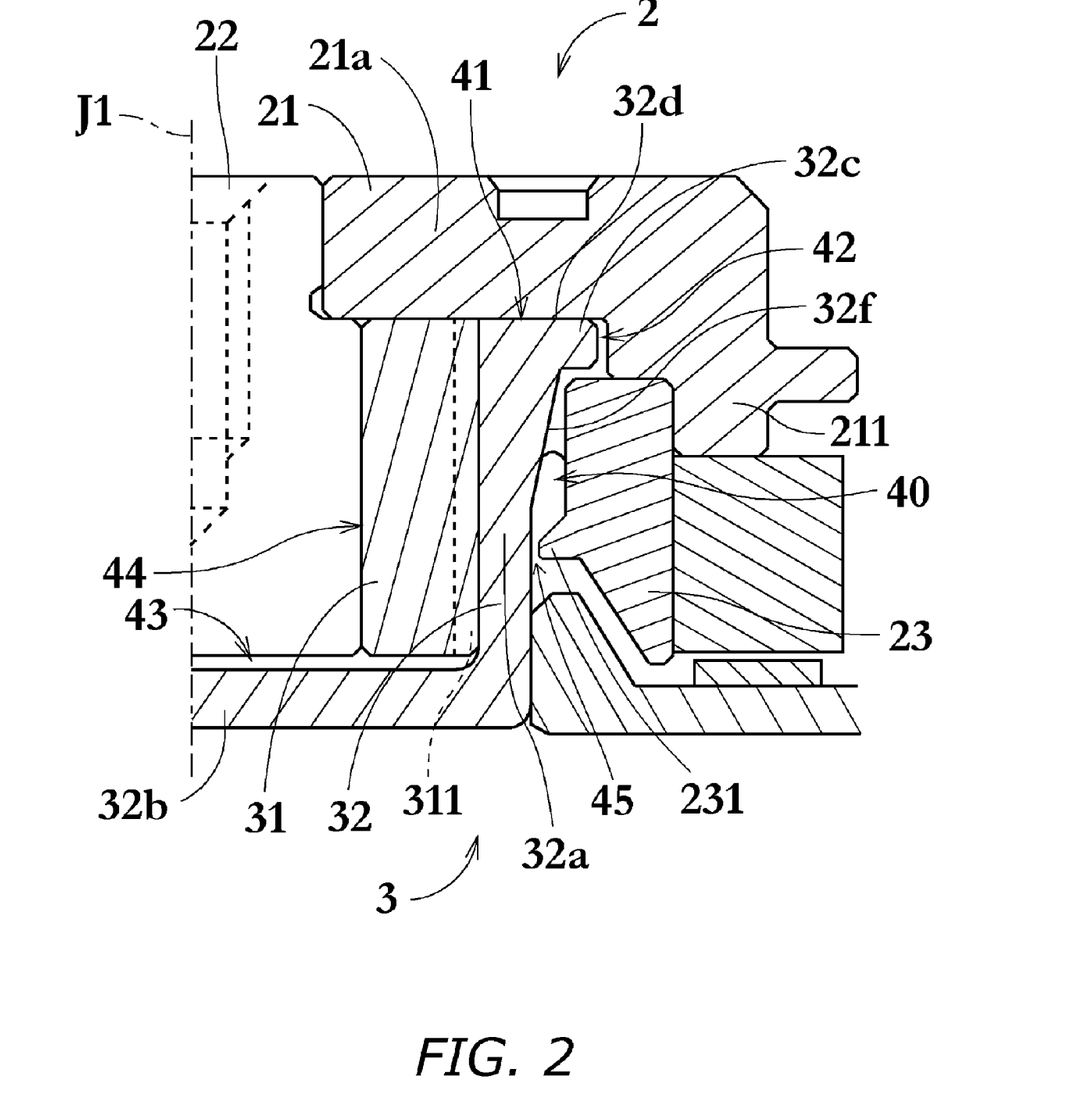
FIG. 2 is a longitudinal section enlargedly showing a portion around a yoke in FIG. 1.

FIG. 2 is a longitudinal section enlargedly showing a portion around the yoke 23. As shown in FIG. 2, the stator bearing 5 includes a bearing housing 32 having a bottomed cylindrical shape and a sleeve 31 having a hollow cylindrical shape which is fixed in the bearing housing 32 by means of press-fitting, adhesion, or the like. The sleeve 31 is formed of a porous sintered body impregnated with oil. However, the invention is not limited to the material. The sleeve 31 molded and sintered by using any of various metal powders, metal compound powders, or non-metallic powders can be used. Examples of the material are Fe—Cu, Cu—Sn, Cu—Sn—Pb, and Fe—C. By molding the sleeve 31 by a porous sintered body, the sleeve 31 can be manufactured at low cost.

The bearing housing 32 is a metal member made of, for example, aluminum alloy, copper, copper alloy, phosphor bronze, or stainless steel by press work. Alternately, the bearing housing 32 may be made of a resin material. By forming the bearing housing 32 by press work, the bearing housing 32 can be manufactured at low cost and the stator bearing 5 having the bearing housing 32 and the sleeve 31 can be manufactured at lower cost. The bearing housing 32 has, on its inside, a stator bearing surrounding wall 32a to which the sleeve 31 is fixed and a circular plate 32b closing the lower end of the stator bearing surrounding wall 32a. With the configuration, the sleeve 31 is surrounded by the bearing housing 32 and the oil impregnated is retained.

In an upper part of the stator bearing surrounding wall 32a, an annular-shaped flange 32c extending from the stator bearing surrounding wall 32a to the outside in the radial direction is formed, and the outer circumferential portion of the flange 32c extends to a position near the inner circumferential portion of the rotor annular portion 211 of the rotor hub 21.

A first clearance 41, a second clearance 43, a third clearance 44, and a fourth clearance 42 are formed between an upper end face 32d of the bearing housing and the lower face of the rotor upper wall 21a, between the lower end face of the shaft 22 and the lower end face of the sleeve 31 and the upper end face of the circular plate 32b, between the inner peripheral face of the sleeve 31 and the outer peripheral face of the shaft 22, and between the outer circumferential face of the flange 32c and the inner circumferential face of the rotor annular portion 211, respectively. The clearances 41 to 44 are filled with oil so as to be communicated with each other.

Figure 3:
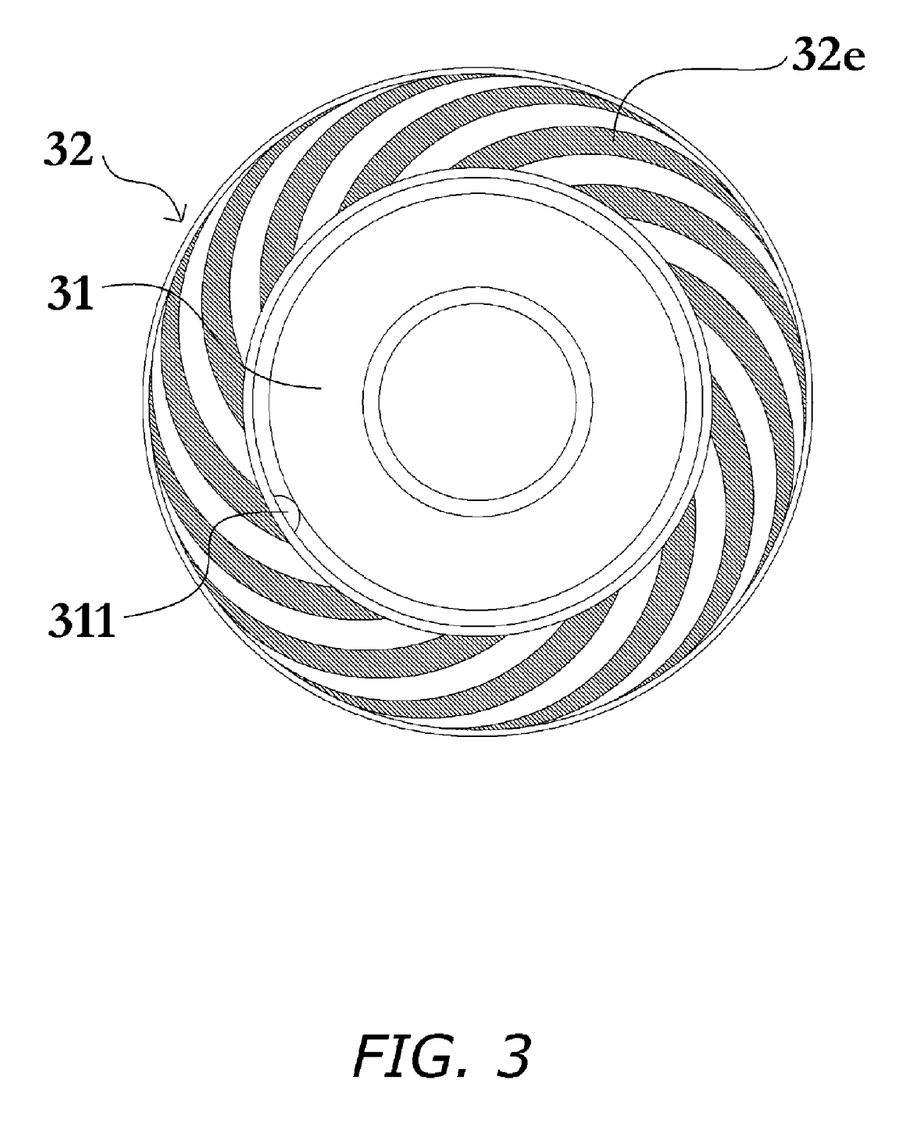
FIG. 3 is a diagram showing an upper end portion of a stator bearing in FIG. 1.

Configuration of Bearing—In the first clearance 41, a thrust bearing is formed. The thrust bearing include the rotor upper wall 21a of the rotor hub 21, the upper end face 32d of the bearing housing 32, and oil retained in the first clearance 41. As shown in FIG. 3, a spiral groove 32e is formed in the upper end face 32d of the bearing housing so that oil dynamic pressure is induced to the inside in the radial direction (the upper peripheral face side of the shaft 22) when the rotor assembly 2 rotates. When the rotor assembly 2 rotates, in the thrust bearing, dynamic pressure to the inside in the radial direction is induced by the spiral groove 32e. By the dynamic pressure, the rotor assembly 2 is floated and the oil inner pressure on the inside in the radial direction is increased. By maintaining a state that the oil pressure is always higher than outside air, air in the oil is prevented from becoming air bubbles. Since the spiral groove 32e is formed by press work at the time of molding the bearing housing 32, a dynamic pressure generating groove can be formed at low cost.

In the sleeve 31, a through hole 311 extending from the first clearance 41 to the third clearance 43 is also formed. By the through hole 311, the pressure of oil in the second clearance 43 becomes equal to that of oil increased in the first clearance 41, and the second clearance 43 plays the role of a thrust hydrostatic bearing.

In the third clearance 44 between the outer peripheral face of the shaft 22 and the inner peripheral face of the sleeve 31, a dynamic pressure generating groove (for example, a pair of herringbone grooves apart from each other in the axial direction) for generating a fluid dynamic pressure in oil is formed, and a pair of radial bearings is constructed. The radial bearing may be provided in one place.

Configuration of Yoke 23—The inner portion of the yoke 23 is projected to the inside in the radial direction from the inner diameter position of the rotor annular portion 211, and the inner diameter of the yoke 23 is formed on the inner side in the radial direction of the outer diameter of the flange 32a. With the configuration, even in the case where the rotor assembly 2 moves apart from the stator assembly 3, the upper end portion of the yoke 23 comes into contact with the flange 32c so that the shaft 22 is prevented from being detached from the sleeve 31. That is, a detachment preventing structure is constructed by the upper end portion of the yoke 23 and the flange 32a. Since the space between the flange 32c and the yoke 23 is filled with oil at the time of the contact, seizure, generation of powders due to friction, and the like can be prevented.

In an upper outer face of the bearing housing 32, a tapered face 32f is formed in such a manner that the outside diameter of the bearing housing 32 gradually increases upward in the axial direction. Consequently, a clearance (a fifth clearance 40) between the inner peripheral face of the yoke 23 and the tapered face 32f of the bearing housing 32 gradually increases downward in the axial direction, and the taper seal area such that the air-fluid boundary becomes meniscus by capillarity and surface tension is formed in the fifth clearance 40. The oil from the fourth clearance 42 via a clearance between the flange 32c and the yoke 23 is properly retained by the yoke 23.

Further, below the air-fluid boundary in the axial direction (that is, in the direction the fifth clearance 40 is widened) in the fifth clearance 40, an annular-shaped projection 231 projecting to the inner side in the radial direction is formed in the inner peripheral face of the yoke 23. The sixth clearance 45 is formed in the radial direction between the tip of the projection 231 and the outer portion of the bearing housing 32. By setting the size of the sixth clearance 45 to be small, the difference between flow velocity of air in the sixth clearance 45 and that of air in the fifth clearance 40 in the taper seal area becomes large when the rotor assembly 2 rotates. Consequently, the sixth clearance 45 functions as a labyrinth seal which maintains high vapor pressure in an area around the air-fluid boundary by increasing resistance of flow to the outside of the bearing of vapor generated when the oil evaporates and prevents further transpiration of oil. The size of the sixth clearance 45 is, for example, 300 μm or less and is preferably 100 μm or less.

Figure 4:
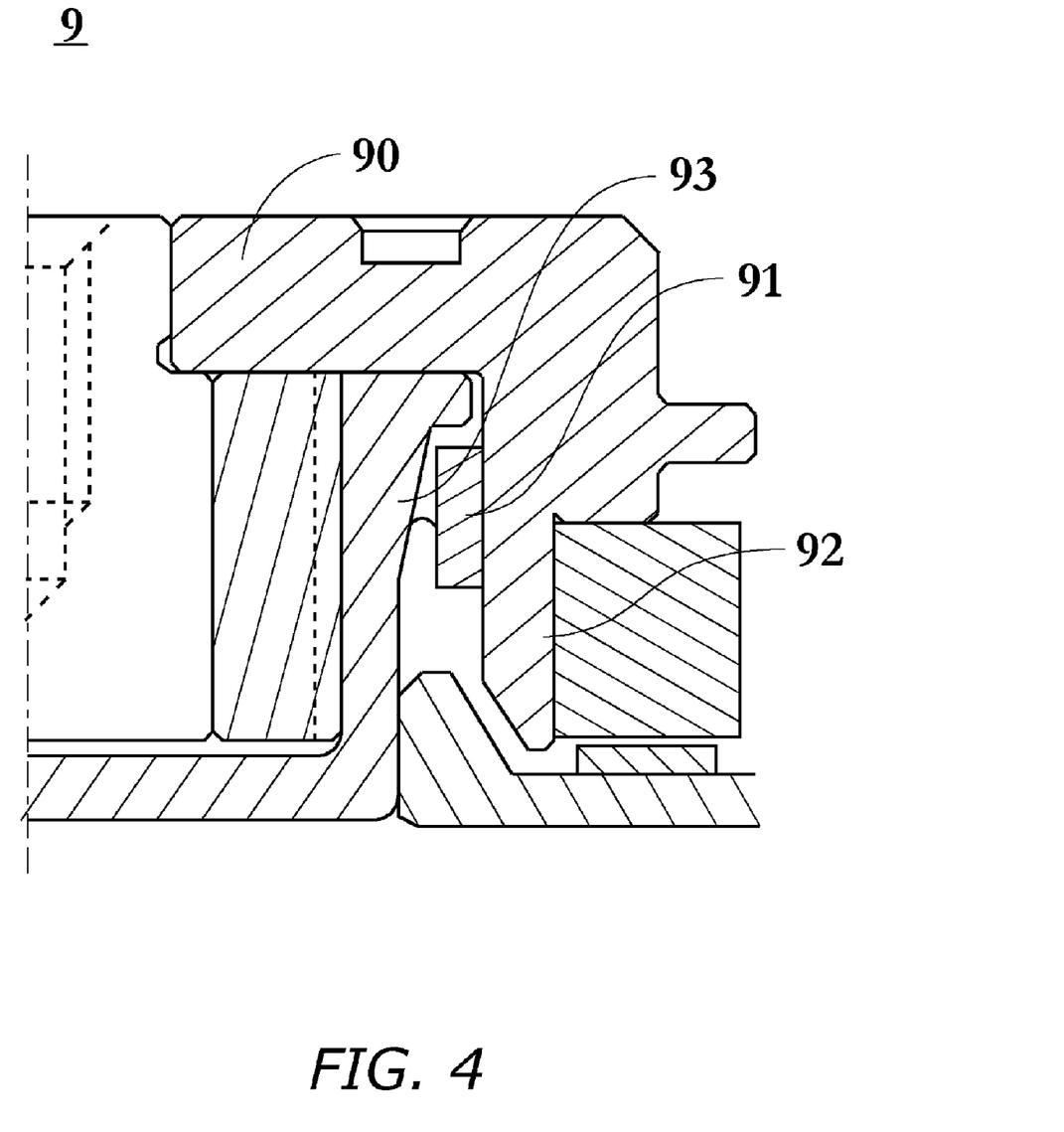
FIG. 4 is a longitudinal section of a spindle motor as a comparative example.

Comparison with Other Spindle Motors—The features on the structure of the spindle motor 1 of FIG. 2 will now be described in comparison with another spindle motor having a detachment preventing member. FIG. 4 is a longitudinal section of another spindle motor 9 having a detachment preventing member 91. As shown in FIG. 4, the detachment preventing member 91 having an annular shape is fixed to the inner portion of a yoke 91 which is formed integrally with a rotor hub 90. The detachment preventing member 91 is disposed below the flange. Consequently, when the sizes of component parts are reduced at the time of miniaturizing the spindle motor 9, the detachment preventing member 91 becomes a very small member. It is difficult to handle the detachment preventing member 91 at the time of manufacturing the spindle motor 9 and deformation or the like may occur in the detachment preventing member 91.

On the other hand, in the spindle motor 1 of FIG. 2, the yoke 23 also playing the role of the detachment preventing member is a relatively large member. For example, when the spindle motor 9 of FIG. 4 and the spindle motor 1 of FIG. 2 are miniaturized to a predetermined size, the thickness in the radial direction of the detachment preventing member 91 in the spindle motor 9 of FIG. 4 becomes 0.3 mm and that of the yoke 23 in the spindle motor 1 of FIG. 2 becomes 0.78 mm. Therefore, deformation or the like does not occur in the yoke 23 at the time of manufacturing the spindle motor 1 and the yoke 23 can be handled easily.

As described above, the yoke 23 has the taper seal structure of retaining the oil kept in the clearances 41 to 44 and the detachment preventing structure of preventing separation between the shaft 22 and the sleeve 31. Thus, the spindle motor 1 can be easily made smaller and thinner as compared with a conventional one.

And in the case where the sizes of the component members of the spindle motor 1 are reduced, the yoke 23 playing the role of the detachment preventing member can be easily handled at the time of manufacturing the spindle motor 1, so that the spindle motor 1 can be manufactured efficiently. Thus, the spindle motor 1 having excellent reliability and durability can be easily made smaller and thinner. Further, as compared with another spindle motor having the detachment preventing member as a member different from a yoke, the number of components of the spindle motor 1 can be decreased and the manufacturing cost of the spindle motor 1 can be reduced.

Second Embodiment

Figure 5:
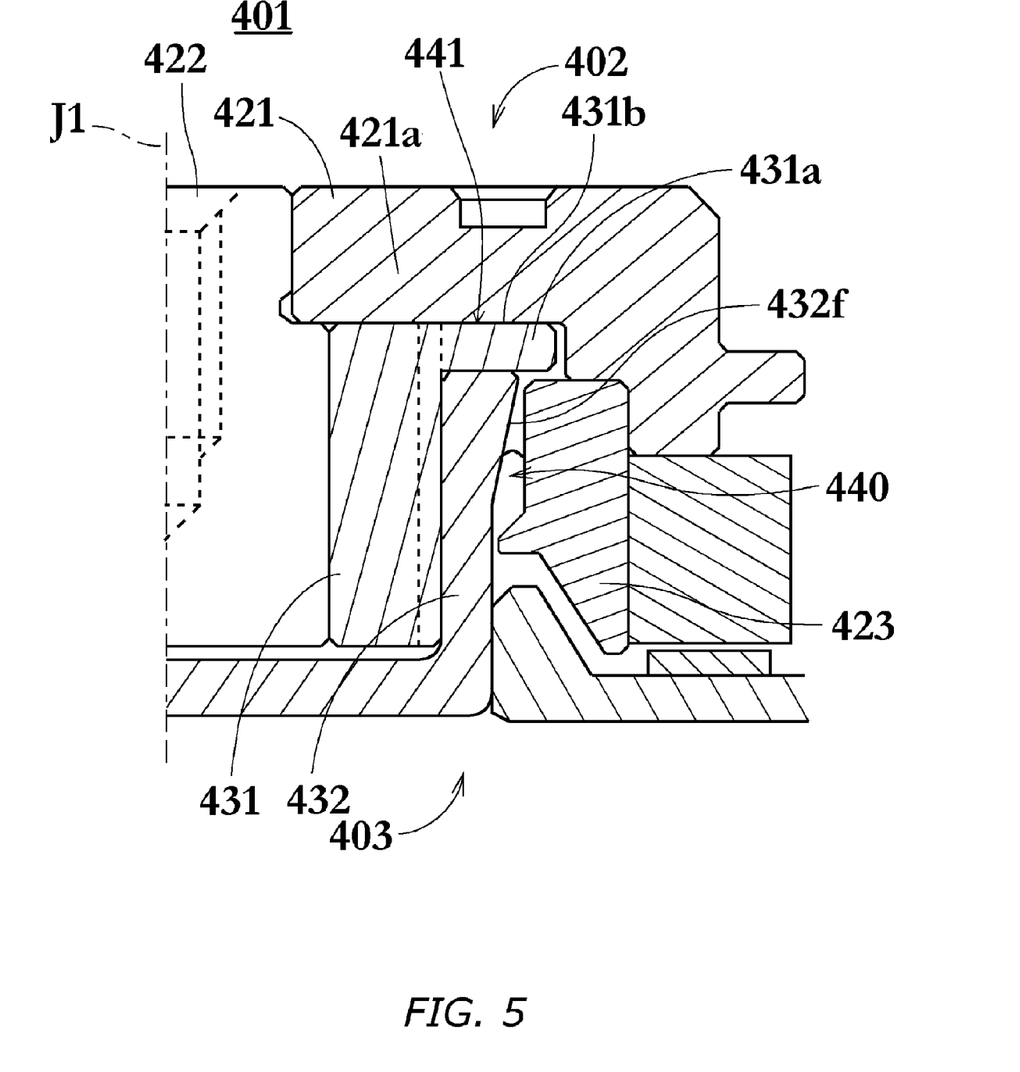
FIG. 5 is a longitudinal section enlargedly showing a portion around a yoke of a spindle motor of a second embodiment.

FIG. 5 is a longitudinal section of a spindle motor 401 of a second embodiment of the invention and corresponds to FIG. 2. Since the basic structure of the spindle motor 401 of the second embodiment is equivalent to that of the first embodiment, the same reference numeral plus 400 is designated as a reference numeral to the corresponding part, thereby showing the correspondence. Only different points will be described.

In an upper portion of a sleeve 431, a sleeve flange 431a having an annular plate shape extending outward in the radial direction is formed. An upper end face of a bearing housing 432 is in contact with the under face of the sleeve flange 431a, and the peripheral face of the sleeve flange 431a projects outward in the radial direction from the peripheral face of the stator bearing surrounding wall of the bearing housing 432. A taper seal area for retaining oil is constructed in a fifth clearance 440 between the inner face of a yoke 423 and a tapered face 432f of the bearing housing 432.

In a first clearance 441, a thrust bearing is formed. The thrust bearing has the under face of a rotor upper wall 421a, an upper end face 431b of the sleeve flange 431a, and oil retained in the first clearance 441. A spiral groove (not shown) is formed in the upper end face 431b of the sleeve flange 431a so that oil dynamic pressure is induced to the inside in the radial direction (the upper outer face side of a shaft 422) when a rotor 402 rotates.

In the spindle motor 401, also in the case where the rotor 402 moves so as to be apart from a stator 403, since the yoke 423 and the sleeve flange 431a come into contact with each other, movement of the yoke 423 is regulated and separation between the shaft 422 and the sleeve 431 is prevented. In a manner similar to the first embodiment, the yoke 423 constructs the taper seal structure of retaining oil and the detachment preventing structure of preventing separation between the shaft 422 and the sleeve 431. Therefore, the spindle motor 401 can be easily made smaller and thinner.

At the time of manufacturing the spindle motor 401, by making the upper end face of the bearing housing 432 come into contact with the under face of the sleeve flange 431a of the sleeve 431, the sleeve 431 and the bearing housing 432 can be positioned with high precision in the direction parallel to the rotation center axis J1.

Third Embodiment

Figure 6:
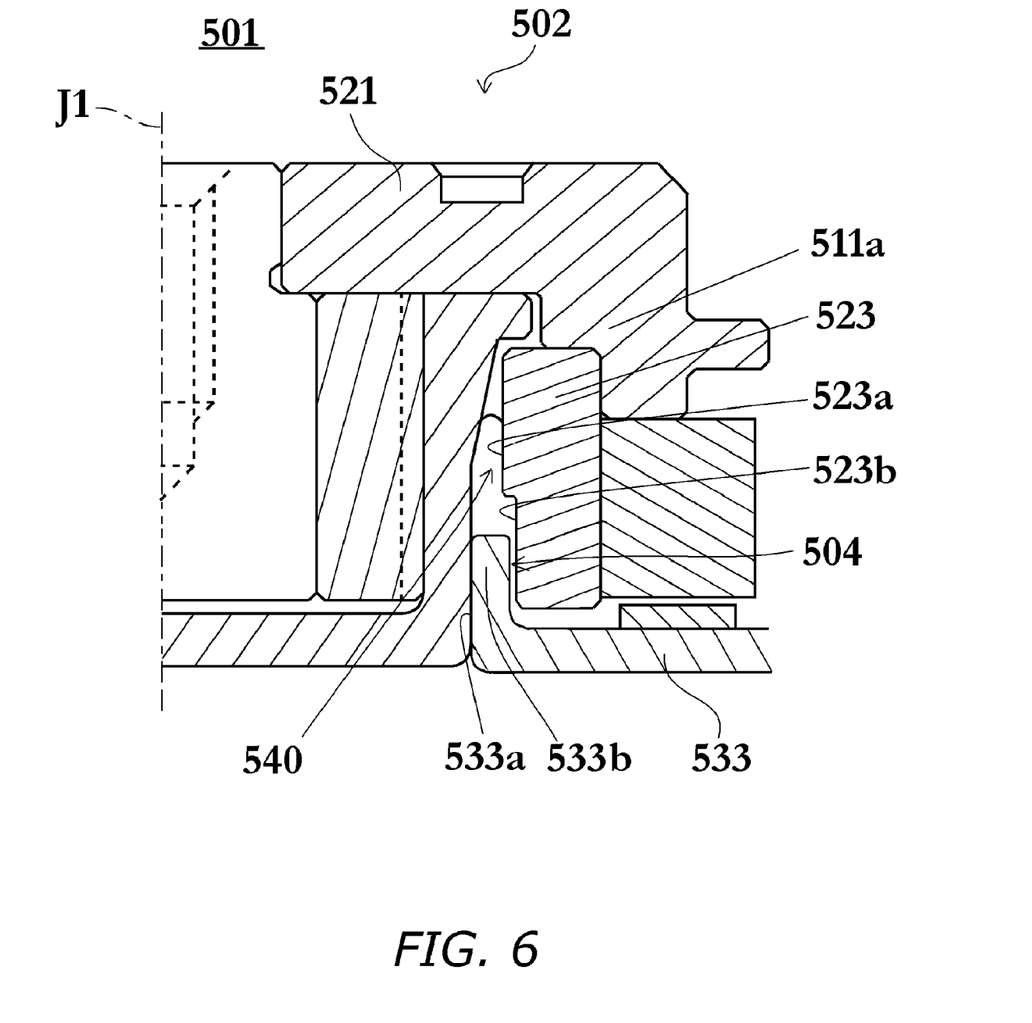
FIG. 6 is a longitudinal section enlargedly showing a portion around a yoke of a spindle motor of a third embodiment.

FIG. 6 is a longitudinal section of a spindle motor 501 of a third embodiment of the invention and corresponds to FIG. 2. Since the basic structure of the spindle motor 501 of the third embodiment is equivalent to that of the first embodiment, the same reference numeral plus 500 is designated as a reference numeral to the corresponding part, thereby showing the correspondence. Only different points will be described.

A through hole 533a is formed in the center of a bracket 533 as a component of a stator, and a cylindrical portion 533b extending upward in the axial direction is formed at the rim of the through hole 533a. The bracket 533 is a member having an approximately cup shape formed by pressing, for example, aluminum, aluminum alloy, magnetic/non-magnetic stainless steel, or cold-rolled steel plate.

Figure 7:
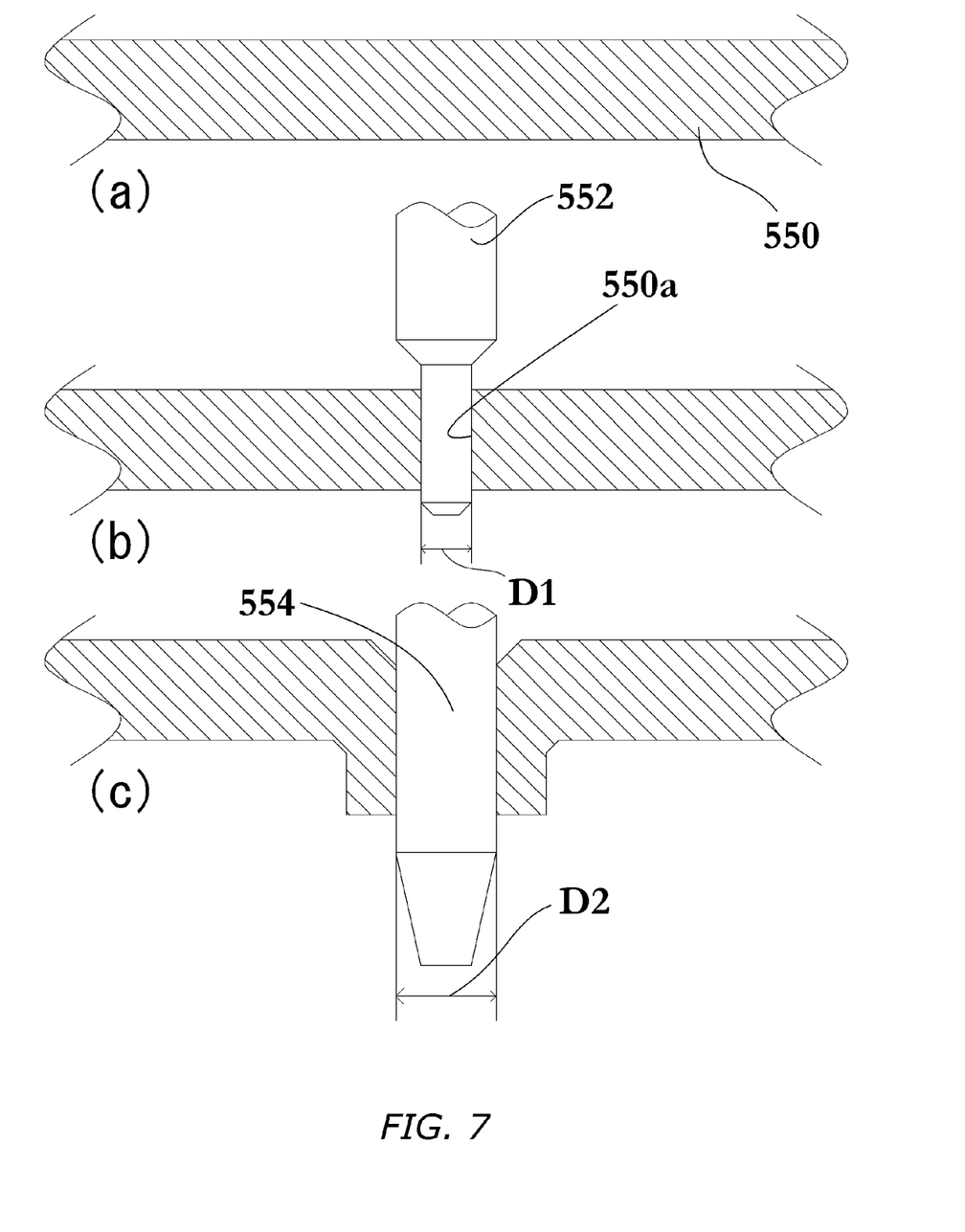
FIGS. 7A to 7C are diagrams showing a process for forming a through hole and a cylindrical portion of a bracket in FIG. 6.

An example of forming the cylindrical portion 533b will now be described. FIG. 7 is a diagram showing a process of forming the cylindrical portion 533b in the bracket 533 by burring. First, a cylindrical punch 552 is pressed perpendicularly against a flat plate 550 to be formed into the bracket 533 as shown in FIG. 7B, thereby forming a prepared hole 550a. After that, a cylindrical burring punch 554 having a diameter (D2) larger than the diameter (D1) of the formed prepared hole 550a is pressed into the prepared hole 550a, thereby forming the through hole 533a and the cylindrical portion 533b shown in FIG. 6 in the flat plate 550. The method of forming the through hole and the cylindrical portion in the flat plate 550 is not limited to the example but various methods can be employed.

By forming the bracket 533 having the through hole 533a and the cylindrical portion 533b by press work as described above, the manufacturing cost can be further reduced.

An annular yoke 523 is fixed to a rotor annular portion 511a of a rotor hub 521. In a lower portion of the yoke 523, a lower inner portion 523b having a diameter larger than that of an upper inner portion 523a of the yoke 523 is formed. The lower inner portion 523b faces the outer portion of the cylindrical portion 533b of the bracket 533 via a seventh clearance 504 in the radial direction. By setting the size of the seventh clearance to be small, the difference between the flow velocity of air in the seventh clearance 504 and the flow velocity of air in a fifth clearance 540 in the taper seal increases when the rotor 502 rotates. Therefore, the seventh clearance 504 functions as a labyrinth seal in a manner similar to the first embodiment. In the third embodiment, effects similar to those of the first embodiment are obtained. In addition, by disposing the stator bearing in the through hole 533a, the height in the axial direction of the stator bearing and the rotor can be reduced. Thus, the spindle motor can be thinned as a whole.

Recording Disk Driving Apparatus

Figure 8:
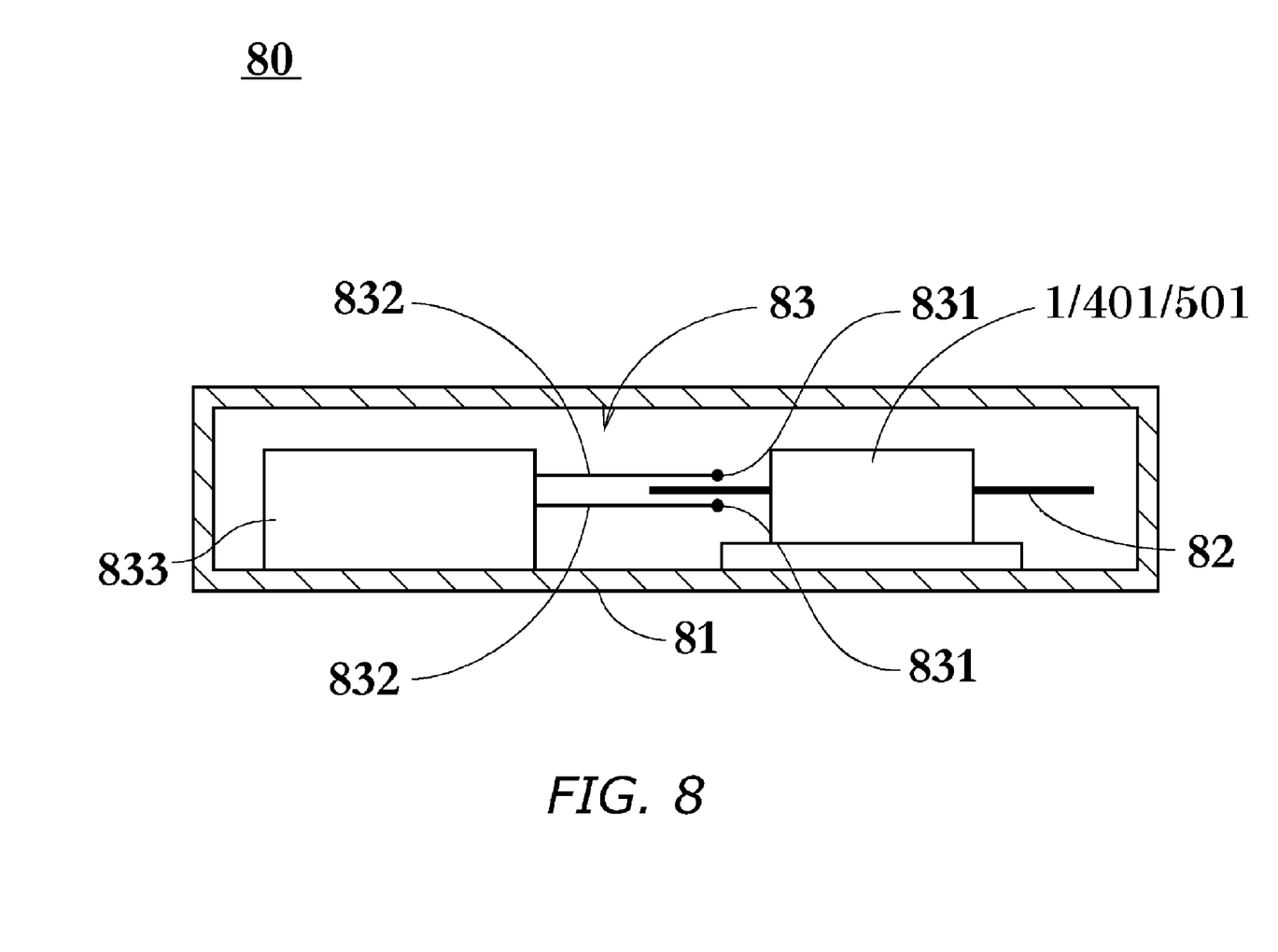
FIG. 8 is a longitudinal section showing a recording disk driving apparatus.

FIG. 8 is a longitudinal section showing the internal configuration of a recording disk driving apparatus 80 to which the spindle motor 1 (401, or 501) is attached. The recording disk driving apparatus 80 is a small electronic device and is used for, for example, a notebook-sized personal computer or small electronic notepad. The inside of the recording disk driving apparatus 80 is a clean space having little dusts because of a housing 81. The housing 81 houses a recording disk 82 as a recording medium having a disc shape (for example, a disk having a diameter of one inch (25.4 mm)), an access unit 83 for writing and (or) reading information to/from the recording disk 82, and the spindle motor 1 for rotating the recording disk 82.

The access unit 83 has: a head 831 which is disposed near the recording disk 82 and magnetically writes/reads information to/from the recording disk 82; an arm 832 for supporting the head 831, and a head moving mechanism 833 for changing the relative positions of the head 831 and the recording disk 82 by moving the arm 832. With the configuration, the head 831 accesses a required position in the recording disk 82 in a state where it is close to the rotating recording disk 82 to write/read information.

By using the spindle motor 1, 401, and 501 of the invention for the recording disk driving apparatus 80, the smaller, thinner, and cheaper recording disk driving apparatus 80 having excellent reliability and durability is realized.

The embodiments of the spindle motor according to the invention and the recording disk driving apparatus having the spindle motor have been described above. However, the invention is not limited to the foregoing embodiments but can be variously modified without departing from the gist of the invention.

For example, the sleeve may be formed by a solid member made of stainless steel, copper, copper alloy, or the like and the outer portion of the sleeve and the yoke may face each other in the radial direction. In this case, a sleeve flange which is fit in the yoke in a non-contact manner is formed at the periphery of the sleeve, and a disc-shaped cap closing the lower end of the sleeve is attached to the lower end of the sleeve.

The dynamic pressure generating groove (for example, spiral groove) formed in the upper end face of the flange of the bearing housing may be formed in the upper end face of the sleeve in place of the upper end face of the flange.

The shaft and the rotor hub may be formed integrally.

The bearing housing flange 32c or sleeve flange 431a does not have to be provided in an upper portion in the axial direction of the bearing housing 32 or 432 but may be provided in any position as long as it extends outward in the radial direction from the bearing housing and, when the rotor moves so as to be apart from the stator, it comes into contact with the yoke to retain the rotor.

It is also possible to make the inner diameter of the yoke forming the taper seal larger than the outer diameter of the bearing housing flange 32c and the sleeve flange 431a and provide a projection in the inner portion of the yoke, which projects to the inside in the radial direction and is retained by the bearing housing flange 32c or sleeve flange 431a.

The fifth clearance for retaining oil does not always have to be gradually enlarged downward in the axial direction by providing the tapered face in the stator bearing surrounding wall of the bearing housing or the outer portion of the sleeve. Alternately, a tapered face may be provided in the inner portion of the yoke. Further, a tapered face may be provided in each of the stator bearing surrounding wall of the bearing housing or the outer portion of the sleeve, and the inner portion of the yoke. In this case, a tapered face obtained in such a manner that the inside diameter of the yoke is gradually narrowed downward to the rotation center axis J1 side is used as the tapered face of the inner portion of the yoke, thereby making the fifth clearance apart from the rotation center axis J1 toward the rotor hub side. As a result, the oil retained in the fifth clearance can be supplied to the thrust bearing by using rotational centrifugal force. The inner diameter of the tapered face of the inner portion of the yoke is not gradually decreased as much as the inner diameter of the tapered face of the stator bearing surrounding wall of the bearing housing or the outer face of the sleeve.

In the foregoing embodiments, the rotor rotates in contrast to the stator. Alternately, the stator may rotate in contrast to the rotor. That is, the rotor and stator may rotate relatively on the rotation center axis. Alternately, the sleeve may be fixed to the rotor and rotate about the shaft fixed to the stator.

The recording disk driving apparatus 80 having the spindle motor can be used as an apparatus for driving not only a magnetic disk but also other disc-shaped recording media such as an optical disk and a magneto optical disk.

What is claimed is:

1. A spindle motor having a rotation center axis, comprising:
   a stator assembly which comprises:
      a bracket having a through hole aligned with said rotation center axis and a cylindrical portion formed at a rim of said through hole;
      a stator fixed to said bracket; and
      a stator bearing which includes a stator bearing surrounding wall having an cylindrical shape, disposed on an inner face of said through hole and extending in the rotation center axial direction, and an annular flange projecting outward in the radial direction from an upper end of said stator bearing surrounding wall;
   a rotor assembly rotated about said rotation center axis, the motor assembly comprises:
      a shaft;
      a rotor upper wall portion fixed to an upper portion in the rotation center axial direction of said shaft;

a rotor annular portion extending downward In the rotation center axial direction from an outer portion of said rotor upper wall portion;

a yoke made of a magnetic material, having an approximately cylindrical shape and a flat endface being perpendicular to the center axis of said yoke, the distance to the edge of said flat endface measured from the center axis of said cylindrical yoke being smaller than that to the outer peripheral surface of said annular flange portion, a portion of said flat endface contacting a portion of said rotor annular portion and being fixed thereto, said annular flange, portion axially interposed between said flat endface of said yoke and said rotor upper wall portion; and a field magnet fixed to the outer peripheral portion of said yoke and facing the inner portion of said stator in the radial direction;

a bearing section including a first clearance formed between an upper end face of said stator bearing and an lower face of said rotor upper wall portion, a lubricating fluid retained as a working fluid in said first clearance; and a taper seal area formed between an outer peripheral surrounding wall and the inner peripheral face of said yoke, in a clearance whose clearance dimension gradually increases downward in the axial direction from said flange, wherein said lubricating fluid forms a air-fluid boundary between the lubricating fluid and an air in said taper seal area.

2. The spindle motor according to claim 1, wherein said bracket is formed by press work.

3. The spindle motor according to claim 2, wherein said cylindrical portion is formed by burring.

4. The spindle motor according to claim 1, wherein said yoke is disposed close to said cylindrical portion, thereby forming a labyrinth seal area in a clearance between an outer part of said yoke and an inner part of said cylindrical portion.

5. The spindle motor according to claim 1, wherein a projection is formed in said yoke, which projects inward in the radial direction from the inner peripheral face of said yoke below said air-fluid boundary in the axial direction and is disposed close to said stator bearing surrounding wall thereby forming a labyrinth seal area in a clearance between an inner part of said projection and an outer part of said stator bearing surrounding well.

6. The spindle motor according to claim 1, wherein said stator bearing comprises:
    a bearing housing which includes:
        said stator bearing surrounding wall;
        said flange; and
        a circular plate closing a lower bottom of said stator bearing surrounding wall;
    a sleeve fixed to the inner portion of said bearing housing and having an inner peripheral face facing said shaft in the radial direction, said lubricating fluid retained and continued from said first clearance, a second clearance between the lower end of said shaft and the upper end face of said circular plate, and a third clearance between the outer peripheral face of said shaft and the inner peripheral face of said sleeve; and
    a radial bearing section including said third clearance and a dynamic pressure generating groove formed on at least one side of the outer peripheral face of said shaft and the inner peripheral face of said sleeve in said third clearance, for generating a dynamic pressure so as to support a rotation of said rotor assembly.

7. The spindle motor according to claim 6, wherein a thrust bearing section including said first clearance and a dynamic pressure generating groove formed on at least one side of the lower face of said rotor upper wall portion and the upper end face of said flange, for generating a dynamic pressure.

8. The spindle motor according to claim 6, wherein said sleeve is formed by a porous sintered member impregnated with said lubricating fluid.

9. The spindle motor according to claim 6, wherein said stator bearing surrounding wall, said flange, and said circular plate are integrally formed by press work.

10. A recording disk driving apparatus in which a disc-shaped recording medium on which information can be recorded is loaded, comprising:
    a housing;
    a spindle motor according to claim 6, which is fixed to the inside of said housing and rotates said recording medium; and
    means for writing/reading information to/from a required position in said recording medium.

11. A spindle motor having a rotation center axis, comprising:
    a stator assembly which comprises:
        a bracket having a through hole aligned with said rotation center axis and a cylindrical portion formed at a rim of said through hole;
        a stator fixed to said bracket;
        a bearing housing which includes a stator bearing surrounding wall having an cylindrical shape, disposed on an inner face of said through hole and extending in the axial direction, an annular flange projecting outward in the radial direction from an upper end of said stator bearing surrounding wall, and a circular plate closing a lower bottom of said stator bearing surrounding wall; and
        a sleeve having an approximately cylindrical shape fixed to the inner peripheral portion of said bearing housing;
    a rotor assembly rotated about said rotation center axis, the rotor assembly comprises:
        a shaft;
        a rotor upper wall portion fixed to an upper portion in the axial direction of said shaft;
        a rotor annular portion extending downward in the axial direction from an outer portion or said rotor upper wall portion;
        a yoke made of a magnetic material, having an approximately cylindrical shape and a flat endface being perpendicular to the center axis of said yoke, the distance to the edge of said flat endface measured from the center axis of said cylindrical yoke being smaller than that to the outer peripheral surface of said annular flange portion, a portion of said flat endface contacting a portion of said rotor annular portion and being fixed thereto, said annular flange portion axially interposed between said flat endface of said yoke and said rotor upper wall portion; and
        a field magnet fixed to the outer peripheral portion of said yoke and facing the inner portion of said stator in the radial direction;
    a bearing section including a first clearance formed between an upper end face of said stator bearing and an lower face of said rotor upper wall portion, a lubricating fluid retained as a working fluid in said first clearance; and a taper seal area formed between an outer peripheral surrounding wall and the inner peripheral face of said yoke, in a clearance whose clearance dimension gradually increases downward in the axial direction from said flange, wherein said lubricating fluid forms a air-fluid boundary between the lubricating fluid and an air in said taper seal area.

12. The spindle motor according to claim 11, wherein said bracket is formed by press work.

13. The spindle motor according to claim 12, wherein said cylindrical portion is formed by burring.

14. The spindle motor according to claim 12, wherein said yoke is disposed close to said cylindrical portion, thereby forming a labyrinth seal area in a clearance between an outer part of said yoke and an inner part of said cylindrical portion.

15. The spindle motor according to claim 11, wherein said bearing housing is an approximately cup-shaped member formed by integrating said stator bearing surrounding wall, said flange, and said circular plate by press work.

16. The spindle motor according to claim 11, wherein said lubricating fluid is retained and continued from said first clearance, a second clearance between the lower end of said shaft and the upper end face of said circular plate, and a third clearance between the outer peripheral face of said shaft and the inner peripheral face of said sleeve, and
a radial bearing section including said third clearance and a dynamic pressure generating groove formed on at least one side of the outer peripheral face of said shaft and the inner peripheral face of said sleeve in said third clearance, for generating a dynamic pressure so as to support a rotation of said rotor assembly.

17. The spindle motor according to claim 16, wherein a thrust bearing section including said first clearance and a dynamic pressure generating groove formed on at least one side of the lower face of said rotor upper wall portion and the upper end face of said flange, for generating a dynamic pressure.

18. The spindle motor according to claim 11, wherein said sleeve is formed by a porous sintered member impregnated with said lubricating fluid.

19. A recording disk driving apparatus in which a disc-shaped recording medium on which information can be recorded is loaded, comprising:

a housing;

a spindle motor according to claim 11, which is fixed to the inside of said housing and rotates said recording medium; and means for writing/reading information to/from a required position in said recording medium.

* * * * *

UNITED STATES PATENT AND TRADEMARK OFFICE
CERTIFICATE OF CORRECTION

| | | |
|---|---|---|
| PATENT NO. | : 7,015,611 B2 | Page 1 of 1 |
| APPLICATION NO. | : 10/904427 | |
| DATED | : March 21, 2006 | |
| INVENTOR(S) | : Shinya Tokunaga and Mitsuhiro Kurino | |

It is certified that error appears in the above-identified patent and that said Letters Patent is hereby corrected as shown below:

On the Title page, (30) the "Foreign Application Priority Data" heading should be stricken, together with the entry "Apr. 25, 2003 (JP), JP-2003-122262."

Signed and Sealed this

Eighteenth Day of December, 2007

JON W. DUDAS
*Director of the United States Patent and Trademark Office*